May 16, 1944.  E. P. BOLEN ET AL  2,349,139

TRIM PANEL

Original Filed June 16, 1941

INVENTORS
EDWARD P. BOLEN
BY EDWARD R. DETRICK

ATTORNEYS

Patented May 16, 1944

2,349,139

UNITED STATES PATENT OFFICE 2,349,139

TRIM PANEL

Edward P. Bolen and Edward R. Detrick, Detroit, Mich., assignors to National Automotive Fibres, Inc., Detroit, Mich., a corporation of Delaware Original application June 16, 1941, Serial No. 398,324. Divided and this application November 30, 1942, Serial No. 467,406

13 Claims. (Cl. 45—138)

This invention relates generally to trim panels and means for decorating the same, and constitutes a division of our application filed June 16, 1941, bearing Serial No. 398,324, which has become U. S. Patent No. 2,317,583 on April 27, 1943.

Heretofore, molding strips have been employed to impart a decorative effect to trim panels, however such strips usually consisted of bars or strips of metal having rounded exterior surfaces that have been chromium plated or otherwise treated to provide a desirable appearance.

In the past these molding strips have been applied to the flat outer surface of the upholstery material of a trim panel, with the result that they stand out to an undesirable degree and have exposed corners, hence they provide a less decorative appearance than is desirable.

According to the present invention we prefer to modify the prior constructions by providing a "debossing" effect on the trim panel. This is carried out by one of several means disclosed herein, and the effect is to provide a panel board in which the trim fabric overlying the panel board forms a debossed channel, or groove, or hollow for the reception of trim molding or other decorative element. Specifically, this effect is carried out by elevating the trim fabric at the sides of the channel.

The invention is equally applicable to improve the appearance of plaques or other decorative insignia or emblems which may be attached to trim panels.

An object of the present invention is to improve the appearance of interior trim panels provided with decorative plaques or trim molding strips by providing a debossed groove or recess for the reception of the plaque or molding strip.

Other objects of the invention will be apparent as the description proceeds, and when taken in conjunction with the accompanying drawing, wherein.

A trim panel used in the interior trim of automotive vehicles normally has a panel board, which may be of an asphalt or bituminous impregnated fibrous material. To this trim panel padding material is normally applied, and over the padding material a fabric is applied which is the same or harmonizes with the fabric employed in the seats and backs of the vehicle.

Figure 1:
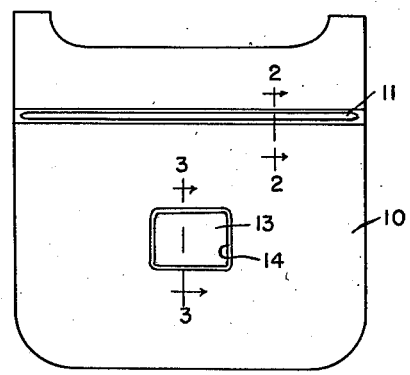
Figure 1 is a front elevation of a trim panel to which, for purposes of illustration, we have shown applied both a trim molding strip and a decorative plaque.
Figure 2:
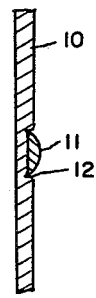
Figure 2 is a schematic section, on an enlarged scale, taken on the line 2—2, Figure 1.
Figure 3:
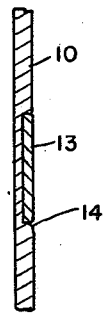
Figure 3 is a schematic section, on an enlarged scale, taken on the line 3—3, Figure 1.

In Figure 1 we have illustrated the front elevation of such a trim panel 10 to which a molding strip 11 is applied, the molding strip being seated in a debossed groove indicated at 12. In the same figure we have shown a plaque or other decorative emblem 13 which is seated in a debossed recess indicated at 14. Figures 2 and 3 show enlarged sections through the molding strip 11 and the plaque 13, illustrate the construction. It will be appreciated that in Figures 2 and 3 the trim panel 10 is indicated as unitary, and no effort is made to show therein the panel board and trim fabric separately.

Figure 4:
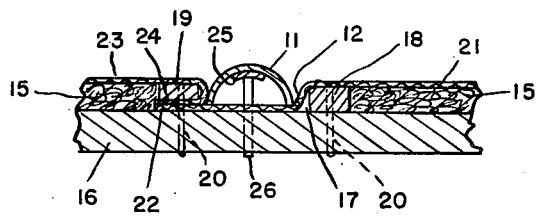
Figure 4 is a fragmentary section through a trim panel illustrating a preferred method of providing a molding strip.

Referring now to Figure 4 we have illustrated one embodiment of the debossment for the reception of the molding strip 11. For example, padding material 15 is spaced apart on the panel board 16 and cooperates therewith to provide an outwardly opening channel shaped recess 17. Riser elements 18 and 19, respectively, extend longitudinally of the recess 17 at opposite side edges thereof and are secured by staples 20 or other suitable fastening elements to the panel board 16. A trim fabric 21 extends over the padding material 15 and riser element 18 at one side of the recess 17 and has an edge portion 22 upon the bottom of the recess 17. A trim fabric 23 extends over the padding material 15 and riser element 19 at the other side of the recess 17 and has an edge portion 24 folded around the inner edge of the riser element 19 and overlying the edge portion 22 of the fabric 21.

The molding strip 11 is within the recess 17 upon the edge portion 22 of the fabric 21 and is secured to the panel board 16 by means of a strip 25 rigid with the underside of the molding strip 11 and having prongs 26 anchored to the panel board 16.

The riser elements 18 and 19 may be formed of any suitable material such as cardboard and are preferably in the form of relatively narrow strips of substantially rectangular cross section. The staples 20 employed as anchorage means for such strips pass through the edge portions 22 and 24, respectively, of the fabrics 21 and 23 and thus secure both fabrics as well as the breaker strips to the panel board.

In applying the decorative plaque, such as shown at 13 in Figures 1 and 3, any suitable method may be employed to provide a debossment of any desired shape or size. Thus for example, while we have illustrated a generally rectangular plaque in Figure 1, it will be appreciated that the same might be circular, or might conform to the shape of an advertising emblem if desired. The plaque 13 may be secured in any convenient manner as by stapling, or by prongs.

The result of the provision of a debossment for the reception of a plaque or trim molding is to improve the appearance of the completed article. Instead of the plaque or trim molding having the appearance of being crudely attached to a flat surface of a trim fabric it appears to be set into the article, with the result that the completed article has an appearance of richness unattainable in previously known constructions. At the same time, by providing the debossment defined by riser elements or ridges surrounding the debossment, the edges of the plaque or molding strip may be concealed to any desirable extent, which is oftentimes rendered necessary or desirable by their unfinished condition.

In addition, the embodiment of our invention illustrated in Figure 4 is particularly useful in trim panels in which two different colors of fabrics are employed, and serves the purpose not only of concealing the seam joining the two fabrics but imparts an additional richness thereto by reason of the debossing effect.

Trim panels of this type are oftentimes provided with padding material in the form of very light fluffy cotton. It is this type of material which is illustrated in the figures. By the provision of riser members of a firm material such as cardboard, it is possible to define a groove or recess with great exactness and to impart a smooth finished appearance to the fabric at the point where it is debossed over the risers into the recess. It will be appreciated of course that the invention may be practiced without padding material on the panel board, in which case the beads in the fabric formed by the riser elements provide what may be termed frames for the molding strips or plaques.

While we have illustrated one embodiment of our debossment for the reception of plaques, molding strips, and similar articles, and have referred specifically to its use in decorating automotive trim panels, it will be understood that the invention is susceptible to use in widely varying fields, and the foregoing complete description has been given merely to enable those skilled in the art to practice the invention, the scope of which is indicated by the appended claims.

What we claim as our invention is:

1. A trim panel having a panel board, padding material spaced apart on said panel board and cooperating therewith to provide an outwardly opening recess, riser elements within and extending longitudinally of said recess at opposite side edges thereof, trim fabric extending over the padding material and riser element at one side of said recess and having a portion upon the bottom of said recess, trim fabric extending over the padding material and riser element at the other side of said recess and having a portion folded inwardly between the last mentioned riser element and the portion aforesaid of the first mentioned fabric, means securing said fabric portions to the panel board, and molding within said recess upon one of the fabric portions mentioned and secured to the panel board.

2. A trim panel having a panel board, padding material spaced apart on said panel board and cooperating therewith to provide an outwardly opening recess, riser elements within said recess at opposite sides thereof, trim fabric extending over the padding material and riser element at one side of said recess and having a portion upon the bottom of said recess, trim fabric extending over the padding material and riser element at the other side of said recess and having a portion folded around the inner edge of the last mentioned riser element and overlying the portion aforesaid of the first mentioned fabric, means securing the last mentioned riser element and fabric portions to the panel board, and molding within said recess upon the first mentioned fabric portion and secured to the panel board.

3. A trim panel having a panel board, padding material spaced apart on said panel board and cooperating therewith to provide an outwardly opening channel shaped recess, riser elements within and extending longitudinally of said recess at opposite side edges thereof, a trim fabric extending over the padding material and riser element at one side of said recess and having an edge portion folded inwardly around and beneath said riser element, a trim fabric extending over the padding material and riser element at the other side of said recess and having an edge portion upon the bottom of said recess and extending beneath the folded edge portion of the first mentioned fabric, and means holding the parts in assembled relation including securing elements extending through the riser elements and engaging said panel board, a portion of said securing elements extending through the edge portions aforesaid of said fabrics, and a molding strip upon the portion of the second mentioned fabric between the riser elements and secured to the panel board.

4. A trim panel having a panel board, padding material spaced apart on said panel board and cooperating therewith to provide an outwardly opening channel shaped recess, riser elements within and extending longitudinally of said recess at opposite side edges thereof, a trim fabric extending over the padding material and riser element at one side of said recess and having an edge portion folded inwardly around and beneath said riser element, a trim fabric extending over the padding material and riser element at the other side of said recess and having an edge portion upon the bottom of said recess and extending beneath the folded edge portion of the first mentioned fabric, and means holding the parts in assembled relation including securing elements extending through the riser elements and engaging said panel board.

5. A trim panel having a panel board, padding material spaced apart on said panel board and cooperating therewith to provide an outwardly opening channel shaped recess, riser elements mounted within and extending longitudinally of said recess at opposite side edges thereof, a trim fabric extending over the padding material and riser element at one side of said recess and having an edge portion folded inwardly around and beneath said riser element, a trim fabric extending over the padding material and riser element at the other side of said recess and having an edge portion upon the bottom of said recess and extending beneath the folded edge portion of the first mentioned fabric, and a decorative element mounted upon the portion of the second mentioned fabric between the riser elements and secured to the panel board.

6. A trim panel having a panel board, riser elements spaced apart on said panel board, a trim fabric for the panel board extending over one of said riser elements and having an edge portion folded inwardly around and beneath said riser element, a trim fabric for the panel board extending over the other riser element and having an edge portion upon the panel board and extending beneath the folded edge portion of the first mentioned fabric, and means holding the parts in assembled relation including securing elements extending through the riser elements and engaging the panel board.

7. A trim panel having a panel board, riser elements spaced apart on said panel board, a trim fabric for the panel board extending over one of said riser elements and having an edge portion folded inwardly around and beneath said riser element, a trim fabric for the panel board extending over the other riser element and having an edge portion upon the panel board and extending beneath the folded edge portion of the first mentioned fabric, a decorative element upon the portion of the second mentioned fabric between the riser elements, means securing the decorative element to the panel board, and means securing the riser elements and fabrics to the panel board.

8. A trim panel having a panel board, padding material spaced apart on said panel board and cooperating therewith to provide an outwardly opening channel-shaped recess, riser elements within and extending longitudinally of said recess at opposite side edges thereof, a trim fabric extending over the padding material at one side of the recess and having a portion folded inwardly around and beneath one of the riser elements, a trim fabric extending over the padding material at the other side of the recess and having a portion overlying the other of said riser elements and extending into the recess across the bottom thereof and beneath the inwardly folded portion aforesaid of the first mentioned fabric, and means concealed by the fabrics and engaging the panel board for holding the parts in assembled relation, including securing elements extending through the riser elements and engaging the panel board, one of said securing elements also extending through the portions aforesaid of both fabrics, and a molding strip upon the portion of the second mentioned fabric on the bottom of said recess and secured to said panel board.

9. A trim panel having a panel board, padding material spaced apart on said panel board and cooperating therewith to provide an outwardly opening channel-shaped recess, riser elements within and extending longitudinally of said recess at opposite side edges thereof, a trim fabric extending over the padding material at one side of the recess and having a portion folded inwardly around and beneath one of the riser elements, a trim fabric extending over the padding material at the other side of the recess and having a portion overlying the other of said riser elements and extending into the recess across the bottom thereof and beneath the inwardly folded portion aforesaid of the first mentioned fabric, and means for holding the parts in assembled relation, including a molding strip upon the portion of the second mentioned fabric on the bottom of said recess and secured to said panel board.

10. A trim panel having a panel board, padding material spaced apart on said panel board and cooperating therewith to provide an outwardly opening channel-shaped recess, riser elements within and extending longitudinally of said recess at opposite side edges thereof, a trim fabric extending over the padding material at one side of the recess and having a portion folded inwardly around and beneath one of the riser elements, a trim fabric extending over the padding material at the other side of the recess and having a portion overlying the other of said riser elements and extending into the recess across the bottom thereof and beneath the inwardly folded portion aforesaid of the first mentioned fabric, and means concealed by the fabrics and engaging the panel board for holding the parts in assembled relation, including securing elements extending through the riser elements and engaging the panel board, one of said securing elements also extending through the portions aforesaid of both fabrics.

11. A trim panel having a panel board, padding material spaced apart on said panel board and cooperating therewith to provide an outwardly opening channel-shaped recess, riser elements within and extending longitudinally of said recess at opposite side edges thereof, a trim fabric extending over the padding material at one side of the recess and having a portion folded inwardly around and beneath one of the riser elements, a trim fabric extending over the padding material at the other side of the recess and having a portion overlying the other of said riser elements and extending into the recess across the bottom thereof and beneath the inwardly folded portion aforesaid of the first mentioned fabric, and means for holding the parts in assembled relation, including a decorative element within said recess between said riser elements, said decorative element being upon the portion of the second mentioned fabric on the bottom of said recess and secured to said panel board.

12. A trim panel having a panel board, padding material spaced apart on said panel board and cooperating therewith to provide an outwardly opening channel shaped recess, riser elements within and extending longitudinally of said recess at opposite side edges thereof, said riser elements being connected to said panel board, a trim fabric extending over the padding material and riser element at one side of said recess and having an edge portion depressed within said recess in surface to surface relation with the bottom thereof, a trim fabric extending over the padding material and riser element at the other side of said recess and having an edge portion folded inwardly around and beneath the last mentioned riser element, a molding strip within said recess and anchored to said panel board, said molding strip clamping the depressed portion of the first mentioned trim fabric against the bottom of the recess aforesaid.

13. A trim panel having a panel board, padding material spaced apart on said panel board and cooperating therewith to provide an outwardly opening channel shaped recess, riser elements within and extending longitudinally of said recess at opposite side edges thereof, a trim fabric extending over the padding material and riser element at one side of said recess and having an edge portion depressed within said recess in surface to surface relation with the bottom thereof, a trim fabric extending over the padding material and riser element at the other side of said recess and having an edge portion folded inwardly around and beneath the last mentioned riser element, a molding strip within the recess upon the edge portion of the first mentioned fabric, and means holding the parts in assembled relation including a connection between the molding strip and panel board, and separate connections between the riser elements and panel board.

EDWARD P. BOLEN.
EDWARD R. DETRICK.